Sept. 26, 1961   N. B. STEVENS ET AL   3,002,125
APPARATUS FOR PRODUCING A SCANNING SEQUENCE
Filed Sept. 22, 1955   3 Sheets-Sheet 1
FIG. 1
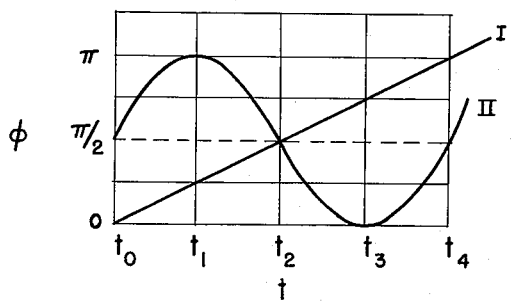
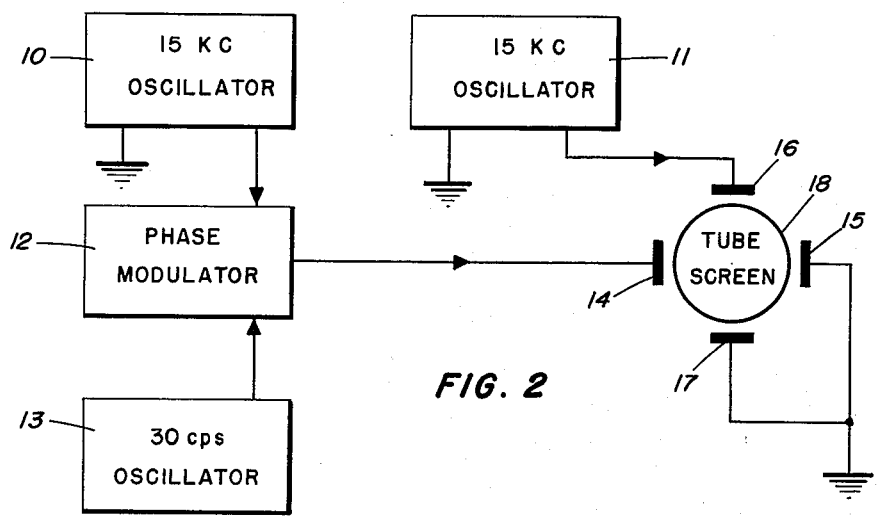
FIG. 2
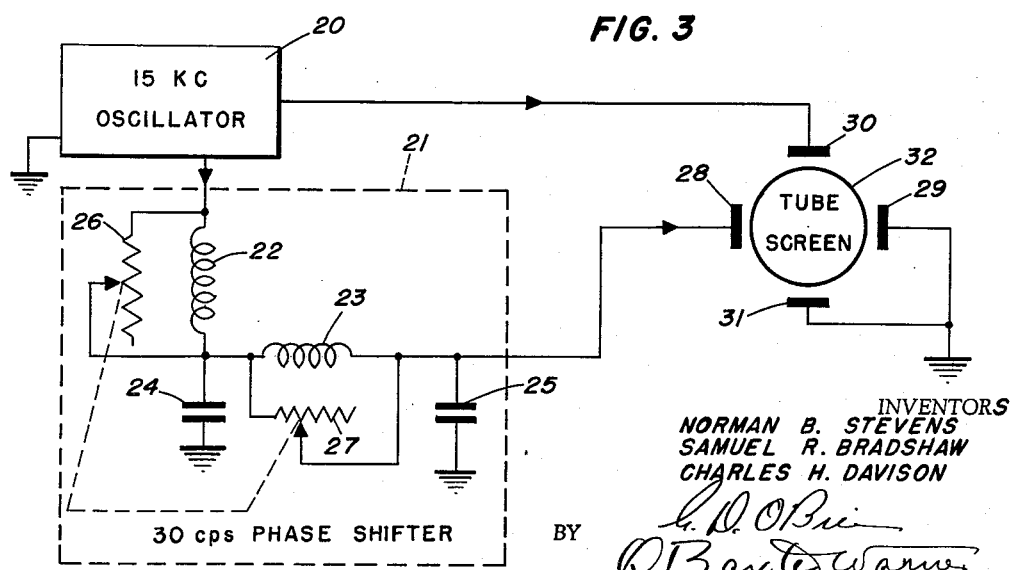
FIG. 3
INVENTORS
NORMAN B. STEVENS
SAMUEL R. BRADSHAW
CHARLES H. DAVISON
BY
ATTORNEYS Sept. 26, 1961    N. B. STEVENS ET AL    3,002,125
APPARATUS FOR PRODUCING A SCANNING SEQUENCE
Filed Sept. 22, 1955    3 Sheets-Sheet 2

INVENTORS
NORMAN B. STEPHENS
SAMUEL R. BRADSHAW
CHARLES H. DAVISON
BY
ATTORNEYS

Sept. 26, 1961  N. B. STEVENS ET AL  3,002,125
APPARATUS FOR PRODUCING A SCANNING SEQUENCE
Filed Sept. 22, 1955  3 Sheets-Sheet 3

INVENTORS
NORMAN B. STEVENS
SAMUEL R. BRADSHAW
CHARLES H. DAVISON

BY
ATTORNEYS 3,002,125
APPARATUS FOR PRODUCING A SCANNING SEQUENCE
Norman B. Stevens, Corona, and Samuel R. Bradshaw, Arlington, Calif., and Charles H. Davison, Fargo, N. Dak., assignors to the United States of America as represented by the Secretary of the Navy
Filed Sept. 22, 1955, Ser. No. 536,056
6 Claims. (Cl. 315—23)
(Granted under Title 35, U.S. Code (1952), sec. 266)

This invention described herein may be manufactured and used by or for the Government of the United States of America for governmental purposes without the payment of any royalties thereon or therefor.

The present invention relates to a method and apparatus for producing a scanning sequence and more particularly relates to such a method and apparatus wherein sweep generation and picture reproduction may be simplified and which will be suitable for use in pilotless aircraft and guided missiles, that home on a target which reflects light or emits near infrared radiation, wherein signals are obtained by electronically scanning the image formed on the face of a suitable television camera tube mounted within the forward transparent portion of such an aircraft or missile, to track the target and to keep the desired image centered on the tube face. The scanned image may be converted into video signals that permit the image to be reconstructed on the tube screen of a monitor receiver.

The scanning sequence or raster that has heretofore been used consisted of a pattern similar to that used in television wherein an electron beam in scanning an image started at the upper left of the tube screen and progressed at a uniform rate from the left edge to the right edge of the screen, then returned rapidly to the left edge to begin the next lower horizontal excursion, repeating these operations until the electron beam had scanned the entire image and reached the bottom of the tube screen, after which the beam returned rapidly to the upper left corner of the tube screen to repeat the cycle at a predetermined picture-repetition rate. In a modification of this scanning sequence, the electron beams scanned the image from top to bottom in alternate rows from the left edge to the right edge of the tube screen and after reaching the bottom of the screen, the beam returned rapidly to the upper left corner thereof and scanning was then repeated to form two interlaced screen scans at a predetermined picture-repetition rate.

To produce these electron beam scanning motions, it was necessary to use either an electric or a magnetic field of force to deflect the beam at a constant velocity from left to right and to deflect the beam rapidly from right to left previous to starting the next lower excursion. A similar field of force linearly deflected the beam slowly from the top to the bottom of the tube screen, after which, the field reversed rapidly to return the beam to the top of the tube screen for the succeeding vertical cycle of operations. The waveform of the magnitude of the field as a function of time required for each complete horizontal cycle and for each complete vertical cycle of the movement of the electron beam resembled a saw tooth.

One of the difficulties encountered with the use of fields of force having saw-tooth waveforms is that the required voltage waveforms are more difficult to generate than if they were sinusoids. Furthermore, when magnetic fields of force having saw-tooth waveforms are used, considerable energy in the magnetic field must be dissipated abruptly and large peak voltages are induced in the windings during the return or flyback time. These steep wave-front voltages in turn introduce interference in adjacent equipment and increase the need for insulation, resulting in large and costly deflection coils. Moreover, the use of abruptly changing voltages and currents made severe power demands, thereby necessitating a low impedance power supply.

Restated, the prior art devices used saw-tooth waveforms employed on both vertical and horizontal axes. These saw-tooth waveforms required complicated generation circuits, greater energy to generate, more insulation on coils, and had many other disadvantages.

It is desirable to reduce or eliminate the difficulties of the prior art devices hereinbefore described and to this end the inventive method and apparatus presents a scanning technique that uses voltages and currents having sinusoidal waveforms and which, in an alternate form, provides for additional scanning along a pair of crossed axes, similar to a pair of artificial cross hairs, that meet in the center of the tube screen and which may be used to align the longitudinal axis of a missile on the target during flight.

Accordingly, the inventive device presents a new type of scanning scheme and apparatus, for generating simple-, and phase modulated-rasters, permitting presentation of a continuous pattern or picture. The inventive apparatus thereby overcomes the defects heretofore mentioned of the prior art apparati and in addition presents advantages in that it is more compatible with the tracking scheme being developed, it presents in a television (unwired) system, a picture lacking the line structure evident in present systems, and requires much less time blanked for synchronization. In a commercial system as outlined herein, receivers are less expensive due to ease of generation of sweeps. Synchronization is much simpler using the inventive method and apparatus.

As is well known, sinusoidal waveforms of fields of force are easily generated and greater efficiency results from their use than from those having saw-tooth waveforms. The use of sinusoidal instead of saw-tooth waveforms of current, in the case of magnetic deflection of an electron beam, also demands less power since resonance of the deflection coils may be employed to give a rise in deflection current. Moreover, with sinusoidal waveforms of voltage or current, interference is reduced and insulation problems are diminished. Frequency control and stabilization are easily achieved with oscillators that generate voltages having sinusoidal waveforms, and amplification without distortion of such voltages is readily attained. Hence, deflecting fields produced by voltages and currents having sinusoidal waveforms cause less out-of-step beam motions between a television camera tube sweep and a monitor tube sweep than fields produced by voltages and currents having saw-tooth or other complex waveforms.

Accordingly, an object of the present invention is to provide a method and apparatus for producing scanning sequence wherein sweep generation and picture reproduction are simplified.

Another aim of the invention is to provide a method and apparatus for producing scanning sequence which is more compatible with a tracking scheme being developed, as for example, in guided missile applications.

Another purpose of the invention is to provide a method and apparatus for producing scanning sequence which will present in a television system, a picture lacking the undesirable line structure evident in present systems, and which requires much less time blanked for synchronization and further which provides a commercial system in which receivers are less expensive due to ease of generation of sweeps and wherein synchronization is much simpler.

Another object of the invention is to provide apparatus affording departure from the conventional TV (television) raster wherein use of two saw-teeth of nearly the same frequency to produce a raster without flyback time can be utilized so that video information can be extracted not only on the left to right but also on the right to left excursions thereby generating a Lissajous pattern with saw teeth.

Another aim of the invention is to provide a television apparatus capable of producing a raster without flyback time in which use of sinusoids may be made so as to provide a raster without flyback time and with video information capable of extraction not only on the left to right but also on the right to left excursions and which is capable of thereby providing a Lissajous pattern.

Another object of the invention is to provide a scanning method and apparatus capable of producing a phase-modulated Lissajous pattern by utilizing a variation in waveform of the phase difference between two sinusoids and applying application of simple synchronization for an unwired system.

Another object of the invention is to provide a new type of scanning scheme, for generating simple, and phase modulated-rasters, thereby permitting presentation of a continuous pattern or picture.

Another purpose of the invention is to provide a method and apparatus for producing scanning sequences suitable for pilotless aircraft and guided missile use where such devices home on a target which reflects light or emits near infrared radiations and wherein the signals are obtained by electronically scanning the image formed on the face of a suitable television camera tube, thereby permitting tracking of the target and keeping a desired image centered on the tube face.

Another aim of the invention is to provide a scanning sequence wherein the scan when converted into video signals permits the image to be reconstructed on the tube screen of a monitor receiver in guided missile and pilotless aircraft applications.

Another purpose of the invention is to provide a scanning method and apparatus which will eliminate difficulties encountered with the use of fields of force having saw-tooth waveforms wherein required voltage waveforms are more difficult to generate than by doing this with a sinusoidal waveform.

Another object of the invention is to provide a scanning method and apparatus which will eliminate dissipation of energy when magnetic fields of forces are used and to prevent inducing of large peak voltages in windings during the return or flyback time which would otherwise cause interference due to the steep wave-front voltages in adjacent equipment and increase the need of insulation.

Another object of the invention is to reduce interference in equipment adjacent to television equipment, to reduce need for insulation, and to provide apparatus which will not need large and costly deflection coils and which will reduce the power demands on circuits which use of abruptly changing voltages and currents would otherwise require.

Another purpose of the invention is to provide a method and apparatus for scanning which will necessitate only a high impedance power supply.

Another object of the invention is to provide a scanning technique and apparatus capable of using voltages and currents having sinusoidal waveforms.

Another aim of the invention is to provide a scanning technique and apparatus which may provide for additional scanning along a pair of crossed axes, similar to a pair of artificial cross hairs that meet in the center of the tube screen and which may be used to align the longitudinal axis of a missile on a target during flight.

Another purpose of the invention is to provide a scanning technique and apparatus using sinusoidal waveforms of fields of force to provide easy generation and greater efficiency, which will demand less power since resonance of deflection coils may be employed to give a rise of deflection current, which will reduce interference, and wherein insulation problems are diminished.

Another object of the invention is to provide a scanning technique and apparatus which generates voltages having sinusoidal waveforms thereby providing better frequency control and stabilization, as well as amplification without distortion of the voltages.

Another object of the invention is to provide an apparatus and a method for scanning which will cause less out-of-step beam motions between a television camera tube sweep and a monitor tube sweep than prior art fields produced by voltages and currents.

Other objects and many of the attendant advantages of this invention will be readily appreciated as the same becomes better understood by reference to the following detailed description when considered in connection with the accompanying drawings wherein:

FIG. 1 shows graphically the relation between elapsed time and the phase angle of two sinusoidally varying voltages;

FIG. 2 is a block diagram of the electrical system of connection of apparatus required to scan with an electric field of force, a tube screen in accordance with our invention;

FIG. 3 is a combination block diagram and schematic representation of a modification of the system shown in FIG. 2;

The inventive apparatus and method provide a manner of obtaining scanning of television camera and monitor tube screens by means of sinusoidally varying electric or magnetic fields of force and also provide for additional scanning along a pair of crossed axes that meet in the center of a tube screen as will be apparent to one skilled in the art from reference to the following description.

Although electrostatic fields of force are indicated and used in the following description to effect electron beam motion and resulting sweep patterns, it will be noted that such fields may be replaced by electromagnetic fields produced by suitably located coils to obtain identical sweep patterns.

Figure 4:
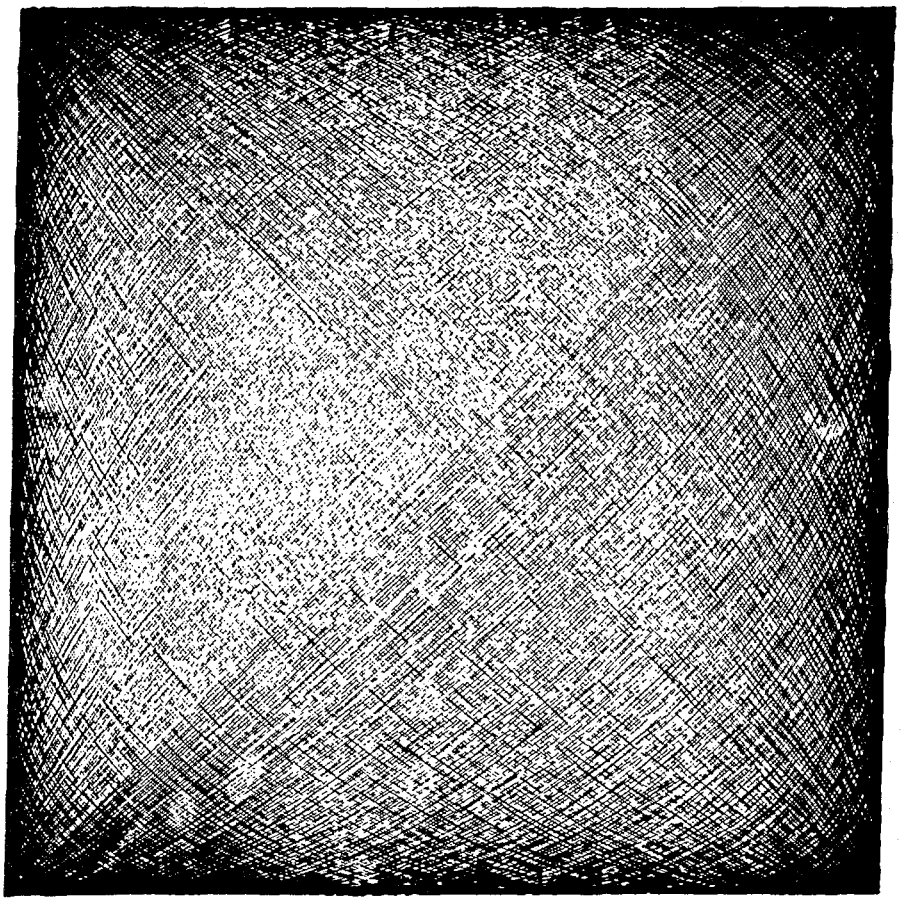
FIG. 4 is a plotting board trace of a simple Lissajous sweep pattern.

Referring more particularly to FIG. 1, abscissae indicate elapsed time and ordinates indicate the phase angle between two sinusoidally varying voltages, one of which is applied to the vertical and the other to the horizontal deflection plates within a television camera tube or a monitor tube to cause an electron beam to scan the face thereof. Curve I shows a linear relationship between the elapsed time and the phase angle between the two alternating voltages, having frequencies of 15,000 c.p.s. (cycles per second) and 15,030 c.p.s. and which are applied to the vertical and horizontal deflection plates, respectively. As is well known, if the amplitudes of the voltages are equal, the beam traces various forms of an ellipse which degenerates to two straight lines, inclined 45 degrees to the axes, at phase angles of $0, \pi, \ldots$, corresponding to $t_0, t_4, \ldots$, and traces a circle at phase angles of $$\frac{\pi}{2}, \frac{3\pi}{2}, \ldots$$

corresponding to $t_2 \ldots$. The pattern goes through a complete series of ellipses, once for each cycle gained by the one frequency on the other. Thus, one such cycle of pattern changes or a complete Lissajous sweep pattern corresponds to one beat between the two input frequencies. FIG. 4 shows a plotting board trace of a simple Lissajous sweep obtained by using frequencies of 15,000 c.p.s. and 15,030 c.p.s. For this case the sweep pattern has a repetition rate of 30 c.p.s.

It will be noted that the resolution is not uniform over the face of the tube; the resolution is a minimum at the center, and a maximum at the edges of the tube. It will also be noted that for scanning with an electrostatic field, the television camera tube or the monitor tube may be rotated through 45 degrees to provide scanning along horizontal and vertical lines and lines adjacent to these that form extremely thin ellipses at the center of the tube face; for scanning with an electromagnetic field, a similar result is obtained by revolving the scanning yoke, which consists of two pairs of coils wound on axes at right angles to each other, about the neck of the tube. In either case, by rejecting all video information from the tracking circuits except that which is generated by the pickup tube when the beam scans along lines near the center of the tube, the requisite scanning in horizontal and vertical directions, desirable for target edge tracking as for example in the case of a discriminatory guidance system, is obtained. It will be noted, however, that video information to any monitor is not rejected.

Figure 5:
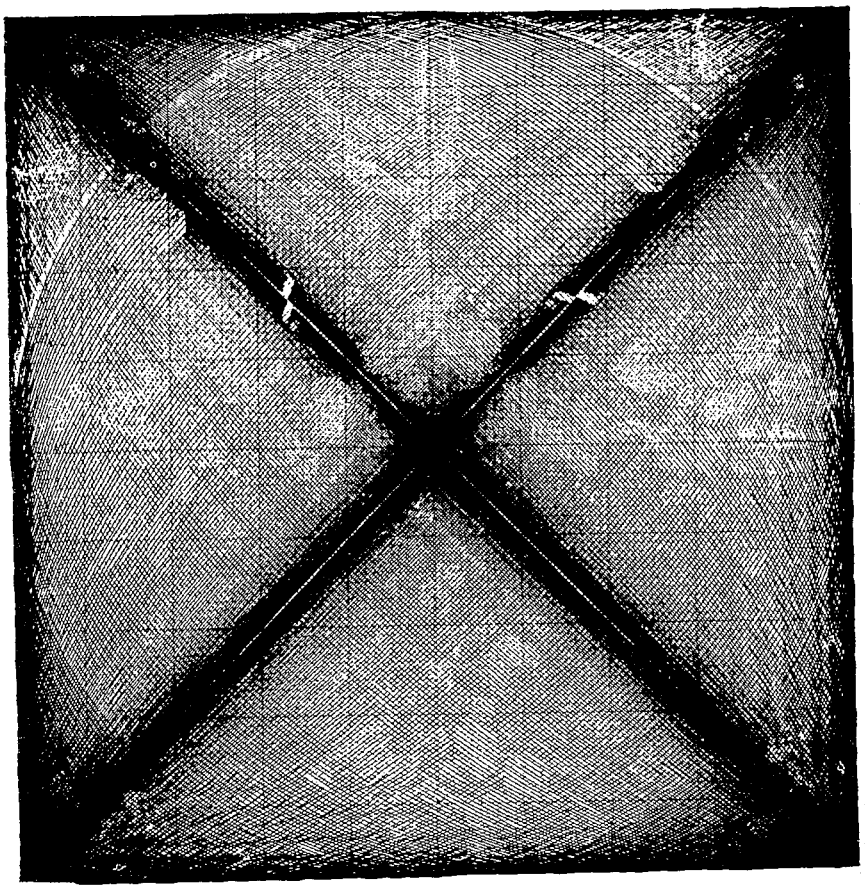
FIG. 5 is a plotting board trace of a phase-modulated Lissajous sweep pattern.

Curve II of FIG. 1 shows the relationship between elapsed time and the phase angle between two sinusoidally varying alternating voltages having the same fundamental frequency of 15,000 c.p.s., but where the phase angle varies sinusoidally from a mean of $\pi/2$ radians to a maximum of $\pi$ radians and a minimum of zero radians at the rate of 30 c.p.s. A plotting board trace of such a phase modulated Lissajous sweep pattern, FIG. 5, shows an increased density or concentration of scanning along lines in the vicinity of the diagonals. When the scanning pattern is rotated as previously described, and when for target edge tracking all video information is rejected except that along lines near the center of the tube, it is evident that increased horizontal and vertical resolution, over that shown in FIG. 4, is obtained in the central portion of the pattern. A high value of resolution for the aforesaid edge tracking application is very desirable since information theory indicates that to provide intelligence, such as, steering information for a guided missile, scanning along a plurality of horizontal and vertical lines yields more reliable operation of control equipment than if scanning were done along only one or two lines.

Referring now to FIG. 2 there is shown therein a block diagram of one embodiment of the electrical system of connection of the apparatus. It should be understood that a plurality of systems of FIG. 2 may be utilized, one system to scan with an electric field of force a tube screen of a television camera tube and one or more with the first similar and synchronized systems to scan the tube screen of one or more monitor tubes to produce the same phase modulated sweep patterns on each tube screen. Similarly, a plurality of systems can be used for other master and slave or principal and remote systems. Each of the two blocks 10, 11 may comprise a high stability vacuum-tube oscillator preferably operating at the designated frequency of 15,000 c.p.s. Block 12 comprises a phase modulator that may consist of a combining network, and block 13 comprises a vacuum-tube oscillator, preferably operating at the designated frequency of 30 c.p.s. Within the television camera tube and also within each monitor tube are horizontal deflection plates 14, 15, and vertical deflection plates 16, 17. The image which is to be televised at the television camera tube and similarly the image which is to be reproduced by one or more monitor tubes appear on their respective tube screens 18.

It should be noted that the television camera tube and one or more monitor tubes may be located within the same system, in which case, the corresponding horizontal deflection plates may be electrically connected in parallel, and the corresponding vertical deflection plates may be similarly connected in parallel.

In operation, an A.-C. voltage of sinusoidal waveform, may be generated by oscillator 11 and applied to deflection plates 16, 17 of a television camera tube or to a pair of similar plates in one or more monitor tubes. An A.C. voltage having the same frequency and waveform is generated by oscillator 10 and is phase modulated by a voltage from oscillator 13 to produce a resultant A.-C. voltage having a fundamental frequency of 15,000 c.p.s., but which may be phase displaced sinusoidally at the rate of 30 c.p.s. from a mean of $\pi/2$ radians to a maximum of $\pi$ radians and a minimum of zero radians from the voltage supplied by oscillator 11. This frequency modulated voltage, which is applied to the alternate pair of deflection plates 14, 15 of each of the afore-mentioned tubes 18, can be adjusted by means of a suitable control in the phase modulator 12 to have the same maximum amplitude as that produced by oscillator 10. The sweep pattern is then traced by an electron beam, emitted by a suitably energized electron gun within each of the aforesaid tubes (tube screens 18) and produces the phase modulated Lissajour pattern of FIG. 5 on tube screen 18.

An alternate method of producing a phase modulated sweep pattern is obtained with the electrical system of connection of apparatus shown in FIG. 3 wherein block 20 comprises a vacuum-tube oscillator, preferably operating at the designated frequency of 15,000 c.p.s., and which is connected to one pair of deflection plates 30, 31 of a television camera tube or a pair of similar plates in one or more monitor tubes. Block 21 may comprise any one of a number of conventional phase shifters that introduces a phase displacement which may be varied continuously between zero radians and $\pi$ radians. Inductors 22, 23, capacitors 24, 25, and resistors 26, 27, which may be varied in value simultaneously at a preferred rate of 30 c.p.s., constitute such a phase shifting network wherein the A.-C. voltage generated by oscillator 20 and which may have a fundamental frequency of 15,000 c.p.s. is phase modulated sinusoidally at the rate of 30 c.p.s. from a mean of $\pi/2$ radians to a maximum of $\pi$ radians and a minimum of zero radians. This phase modulated voltage may be applied to the alternate pair of deflection plates 28, 29 of the aforesaid tube or tubes (tube screens 32).

As hereinbefore described, an electron beam of a suitably energized television camera tube or monitor tube scans at the rate of 30 c.p.s., tube screen 32 in a phase modulated sweep pattern similar to that shown in FIG. 5. Scanning along a predetermined number of nearly horizontal and vertical lines at the center of tube screen 32 is achieved as before by rotating the sweep pattern through 45 degrees and rejecting all video information except that along the desired lines.

Synchronization of scanning in a television camera tube and scanning in one or more monitor tubes, wherein simple or phase modulated Lissajous sweep patterns are produced, may be effected for television, as is well known in the art, by means of periodic synchronizing pulses and suitable synchronizing control circuits.

As hereinbefore indicated FIG. 4 presents a plot of a Lissajour pattern using 15 kc. (15 kilocycles) and 15.030 kc. in which the axes are plotted as follows:

$$X = A \sin 2\pi ft$$
$$Y = A \sin 2\pi f_1 t$$

where $f = 15{,}000$ c.p.s. and $f_1 = 15{,}030$ c.p.s.

FIG. 5 is a plot of a phase modulated Lissajous pattern wherein:

$$X = A \sin 2\pi ft$$
$$Y = A \sin \left(2\pi ft + \frac{\pi}{2} \sin 2\pi f_1 t + \frac{\pi}{2}\right)$$

where $f = 15{,}000$ c.p.s. and $f_1 = 30$ c.p.s.

Thus, the inventive apparatus and means presents a new type of scanning scheme and apparatus, for generating simple-and phase modulated-rasters, giving presentation of a continuous pattern or picture.

While we have shown and described the preferred embodiments of our invention, it will be apparent that the invention is by no means limited to a method for obtaining a simple Lissajous sweep pattern and a specific sinusoidally phase modulated sweep pattern; other mean phase displacements, other limits of phase variation, and other waveforms of phase modulation other than those described may be used either singly or in combination to produce desirable phase modulated sweep patterns.

Obviously many modifications and variations of the present invention are possible in the light of the above teachings. It is therefore to be understood that within the scope of the appended claims the invention may be practiced otherwise than as specifically described.

What is claimed is:

1. Apparatus for electronically scanning the image formed on the face of a television camera tube comprising a first and a second oscillator each operating at a radio frequency, a television tube comprising a television tube screen, a pair of vertical deflection plates, and a pair of horizontal deflection plates; an oscillator to produce voltage in the audio frequency range, a phase modulator, A.-C. voltage from one of said radio frequency oscillators being applied to one pair of the deflection plates of said tube, the radio frequency output of the other oscillator being phase modulated by voltage from the audio frequency oscillator to produce a resultant A.-C. voltage having the fundamental frequency of the radio frequency oscillator, but which is phase displaced sinusoidally at the audio rate from a mean of $\pi/2$ radians to a maximum of $\pi$ radians and a minimum of zero radians from the voltage supplied by the radio frequency oscillators.

2. Means to scan a tube screen of a television camera tube with an electrical field of force comprising a television tube including a tube screen, a pair of vertical deflection plates and a pair of horizontal deflection plates, first and second means to generate a radio frequency signal, an audio frequency means to provide a signal varying at an audio rate, said first and second radio frequency means being of characteristics to produce substantially identical radio frequency signals, means to phase modulate one of said radio frequency means with said audio frequency means, output of the other of said radio frequency means being applied to a plate of one pair of the deflection plates of the tube, output of said phase modulated radio frequency signals from said one of said radio frequency means being applied to a deflection plate of the second pair of deflection plates of the tube.

3. Apparatus to scan a tube screen of a television camera tube with an electric field of force, said tube comprising a tube screen, a pair of vertical deflection plates and a pair of horizontal deflection plates, said apparatus comprising a first radio frequency oscillator, a second radio frequency oscillator, said first and second radio frequency oscillators producing equal frequencies of radio frequency oscillations, an audio frequency oscillator, a phase modulator to phase modulate said first radio frequency oscillator with said audio frequency oscillator, and means to apply said phase modulated signal to at least one deflection plate of said horizontal deflection plates, and means to apply oscillations from said second radio frequency oscillator to at least one deflection plate of the vertical deflection plates of said tube.

4. Apparatus to provide a scan of a cathode ray tube having a tube screen, a pair of horizontal deflection plates and a pair of vertical deflection plates; said apparatus comprising means to produce a radio frequency to be applied to one set of said deflection plates, means to provide phase shifting of said radio frequency at an audio rate, said phase shifting signal output being applied to the other deflection plates of said cathode ray tube.

5. Means to provide a phase modulated Lissajous pattern on a tube screen, said means comprising a vacuum tube oscillator operating at a closely controlled radio frequency, said vacuum tube oscillator having a first output directly connected to at least one deflection plate of a pair of deflection plates of said tube and a second output, an audio frequency phase shifter connected to said second output to introduce a phase displacement continuously varying between zero radians and $\pi$ radians and applied to the second output of said means to generate a radio frequency, the output of said phase shifter being applied to at least one of the other pair of the deflection plates of said tube.

6. Means to produce a phase modulated sweep pattern on the face of a cathode ray tube screen, said means comprising a vacuum tube oscillator to generate a radio frequency of the order of 15,000 c.p.s., said cathode ray tube having a first and a second pair of deflection plates, an unmodulated radio frequency voltage from said oscillator being applied to the first pair of deflection plates of the cathode ray tube, a phase shifter of the order of 30 c.p.s. comprising a plurality of conventional phase shifters to introduce a continuously variable phase displacement of said 15,000 c.p.s. oscillator, thereby phase modulating the fundamental frequency of 15,000 c.p.s. sinusoidally at the rate of 30 c.p.s. from a mean of $\pi/2$ radians to a maximum of $\pi$ radians and a minimum of zero radians, the phase modulated voltage being applied to the second pair of deflection plates of the cathode ray tube.

References Cited in the file of this patent

UNITED STATES PATENTS

| | | |
|---|---|---|
| 2,212,640 | Hogan | Aug. 27, 1940 |
| 2,254,023 | Wright et al. | Aug. 26, 1941 |
| 2,292,045 | Burnett | Aug. 4, 1942 |
| 2,717,329 | Jones et al. | Sept. 6, 1955 |